(No Model.)

J. H. FRAZEE.
CULTIVATOR.

No. 331,048.　　　　　　　Patented Nov. 24, 1885.

WITNESSES:
Robert Kirk
Ella W. Chapman

INVENTOR:
James H. Frazee
By J. S. Zerbe
Attorney.

UNITED STATES PATENT OFFICE.

JAMES H. FRAZEE, OF RUSHVILLE, INDIANA.

CULTIVATOR.

SPECIFICATION forming part of Letters Patent No. 331,048, dated November 24, 1885.

Application filed March 23, 1885. Serial No. 159,758. (No model.)

*To all whom it may concern:*

Be it known that I, JAMES H. FRAZEE, of Rushville, in the county of Rush and State of Indiana, have invented a new and useful Improvement in Cultivators, which improvement is fully set forth in the following specification and accompanying drawings, in which—

Figure 1:
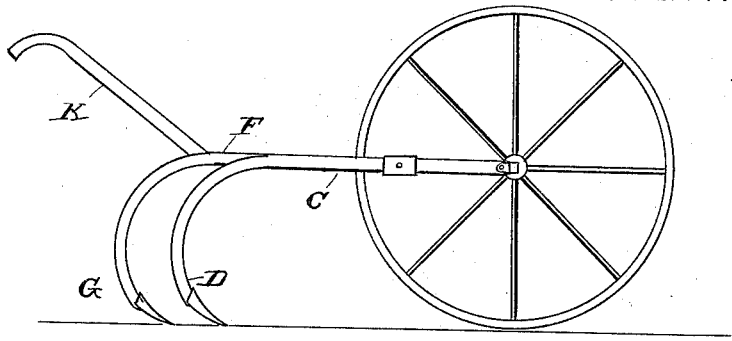
Figure 2:
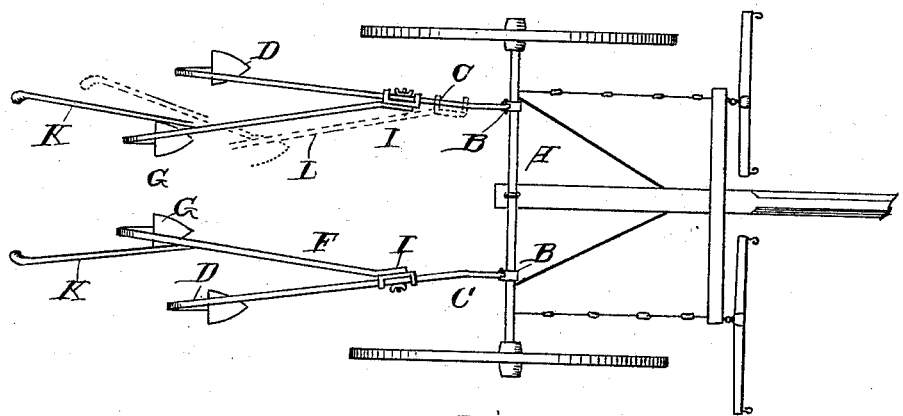
Figure 3:
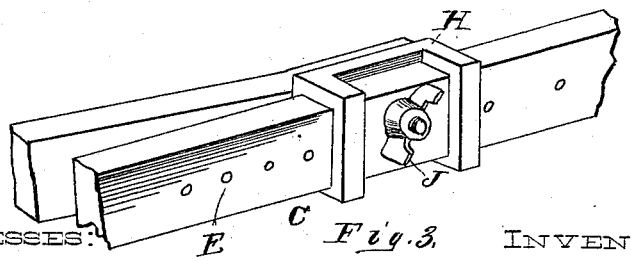

Figure 1 is a side elevation of my cultivator. Fig. 2 is a top or plan view, and Fig. 3 an enlarged perspective view of the collar or sleeve on the plow-beam to which the handle and adjustable beam are attached.

The object of my invention is to provide a double cultivator, or cultivator which is designed to cultivate both sides of one row at the same time, with one set of teeth hinged at a permanent distance from the axle, and an inner set of cultivator-shovels attached adjustably to the beams which carry the outer shovels, so that in using the cultivator the operator can adjust the inner shovels so that they will be either upon a line with each other or directly side by side, or one slightly in advance of the other, the object being to have the shovel which is slightly in advance first throw over the dirt on the grass and weeds which surround the hills of corn, so that when the shovel which follows upon the other side throws the dirt over the weeds will be effectually covered, and will prevent the hilling process so common in cases where the shovels on opposite sides of the corn-row throw up the dirt at the same time; and to accomplish this I make two independent beams on each side of the row of corn, one beam, known as the "outer" beam, being hinged or attached to the axle in any suitable manner, and the inner beam has its forward end secured to the outer beam by means of a sliding collar, so that it may be moved backward or forward, as is desired by the operator, the handles being preferably attached to the inner adjustable beams, as will now be set forth in detail.

In the accompanying drawings, A represents a cultivator-axle having near each end, at the proper distance apart, collars B, or clips, if more desirable, to which the forward ends of the cultivator-beams C are attached by means of a hinge or of a bolt, or in any manner that may be most available. These beams extend rearwardly a suitable distance, and are curved downwardly to receive at their lower ends cultivator-shovels D. The beams C along the horizontal part are provided with holes E, the use of which will be hereinafter set forth.

F represents cultivator-beams somewhat shorter than the cultivator-beams C. These are also provided at their rear ends with shovels G G. The forward ends of these beams are hinged to collars H. These collars slide upon the beams C C, and, as shown in the accompanying drawings, are provided with bolts I, which pass through the forward ends of the inner beams, F F, and also through the collars H and beams C. A thumb-nut, J, is employed to hold the bolt in position, as shown.

As shown in Fig. 2, the inner shovels, G G, are located exactly side by side; but in operation in the field I design to have one of these shovels slightly in advance of the other shovel, so that the dirt will first be thrown over the wheels in a line with the corn-row and around the hills of corn without hilling up the dirt around the corn, as heretofore stated. The handles K are preferably attached to the inner beams, F F, although it is obvious that the handles may be attached to the outer beams; but since the beams F F are nearer together, and are required to be more directly within the control of the operator, I prefer to have the handles attached to the inner beams.

I do not confine my invention to the form of axle herein shown, since I can apply it to any form of cultivator, as well as to the specific one shown, and, moreover, the invention has no reference to the gearing of the axle, but to the plow-beams and their relation to each other, as set forth. It will be seen that the slide or collar is so adjusted that the inside shovels can be set in front as well as in the rear of the outside shovels, as indicated by means of the dotted lines L, Fig. 2. The advantage of having them in the rear at any time is when the corn is small. It leaves a furrow next to the corn when it is small. Then when the corn gets larger the weeds are much easier covered than if the corn-rows are being hilled up from the first plowing, and also it admits the warm rays of the sun so much closer to the roots of the corn when it is small, causing a vigorous growth from the first plowing.

What I claim is—

1. In a wheel-cultivator, the combination of the two outer shovel-beams attached to the axle of two transporting-wheels with the two inner shovel-beams adjustably secured to said outer beams, substantially as described.

2. In a wheel-cultivator, the combination of the outer shovel-carrying beams having double open collars, said collars being rigidly secured to the inner shovel-beams, and adapted to be fixed at any desired adjustment by a set-screw, which is situated between the bands of the double collars, with the inner shovels, the handles, and the axle, substantially as set forth.

In testimony that I claim the foregoing I have hereunto set my hand, this 31st day of January, 1885, in the presence of witnesses.

JAMES H. FRAZEE.

Witnesses:
JOHN C. PARKER,
JAMES E. LAUGHLIN.